April 2, 1963   F. W. BARBKNECHT ETAL   3,083,440
METHOD AND APPARATUS FOR MAKING NOTCHED
AGRICULTURAL DISKS
Filed Nov. 20, 1959   5 Sheets-Sheet 1
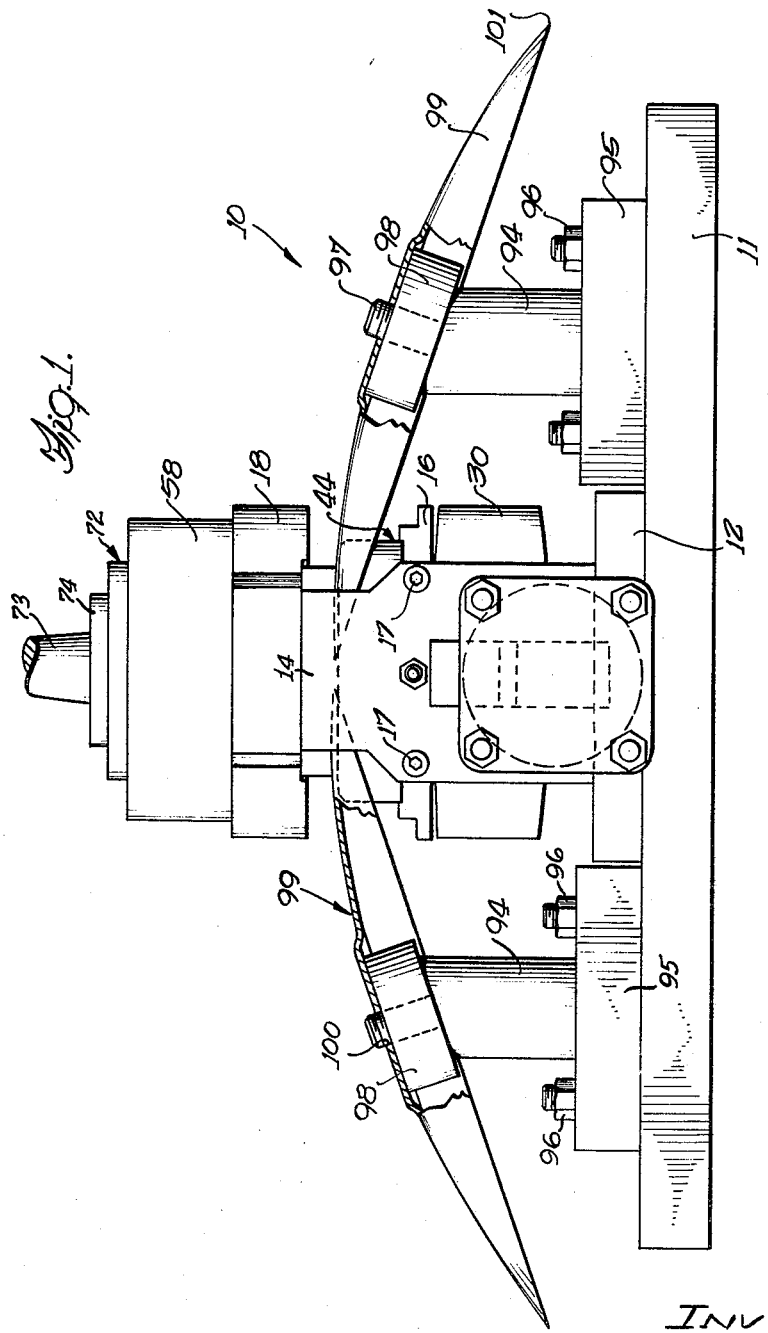
INVENTORS
FRED W. BARBKNECHT
EDWARD J. GULLY
Paul O. Pippel
ATTORNEY

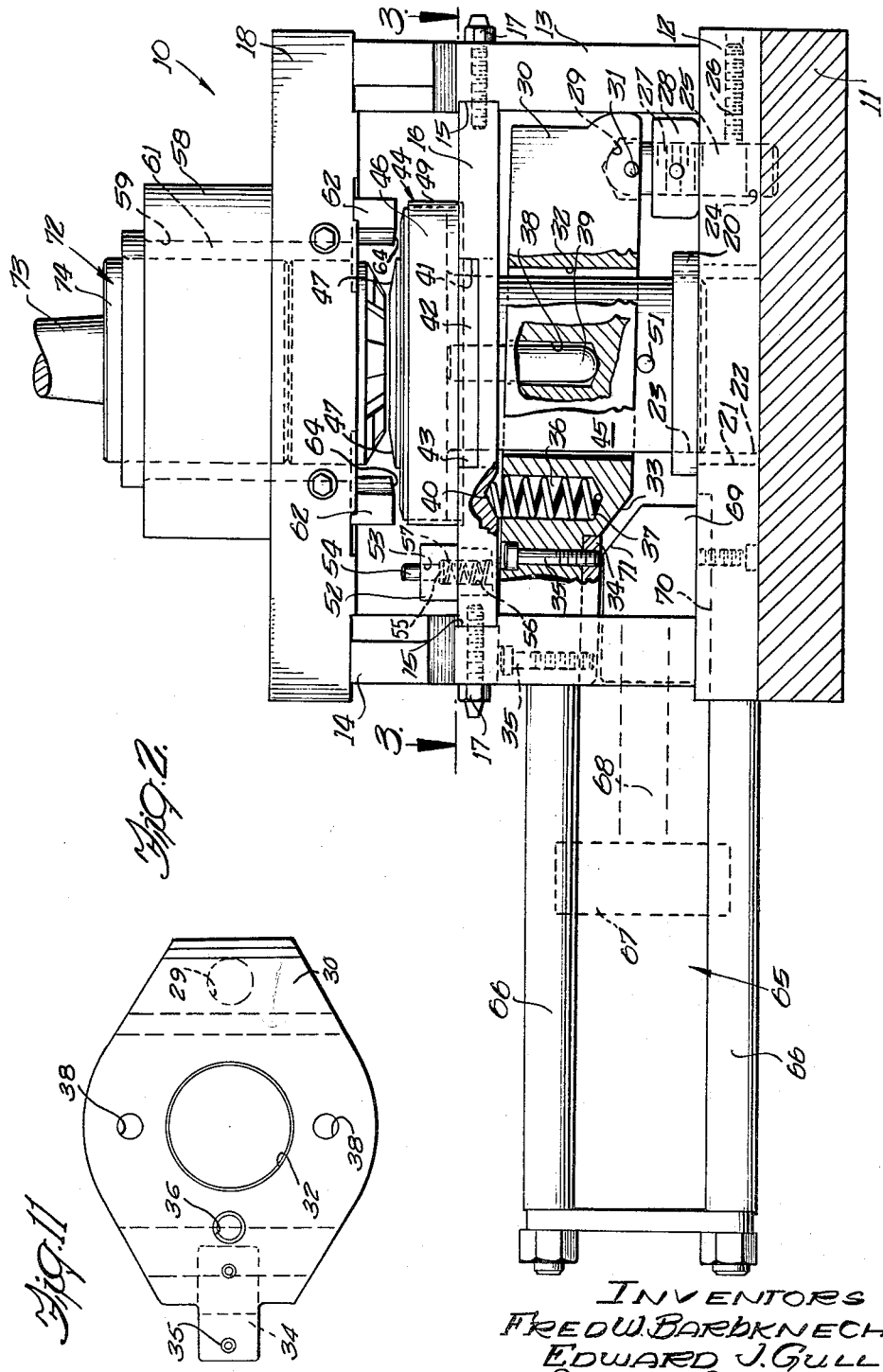

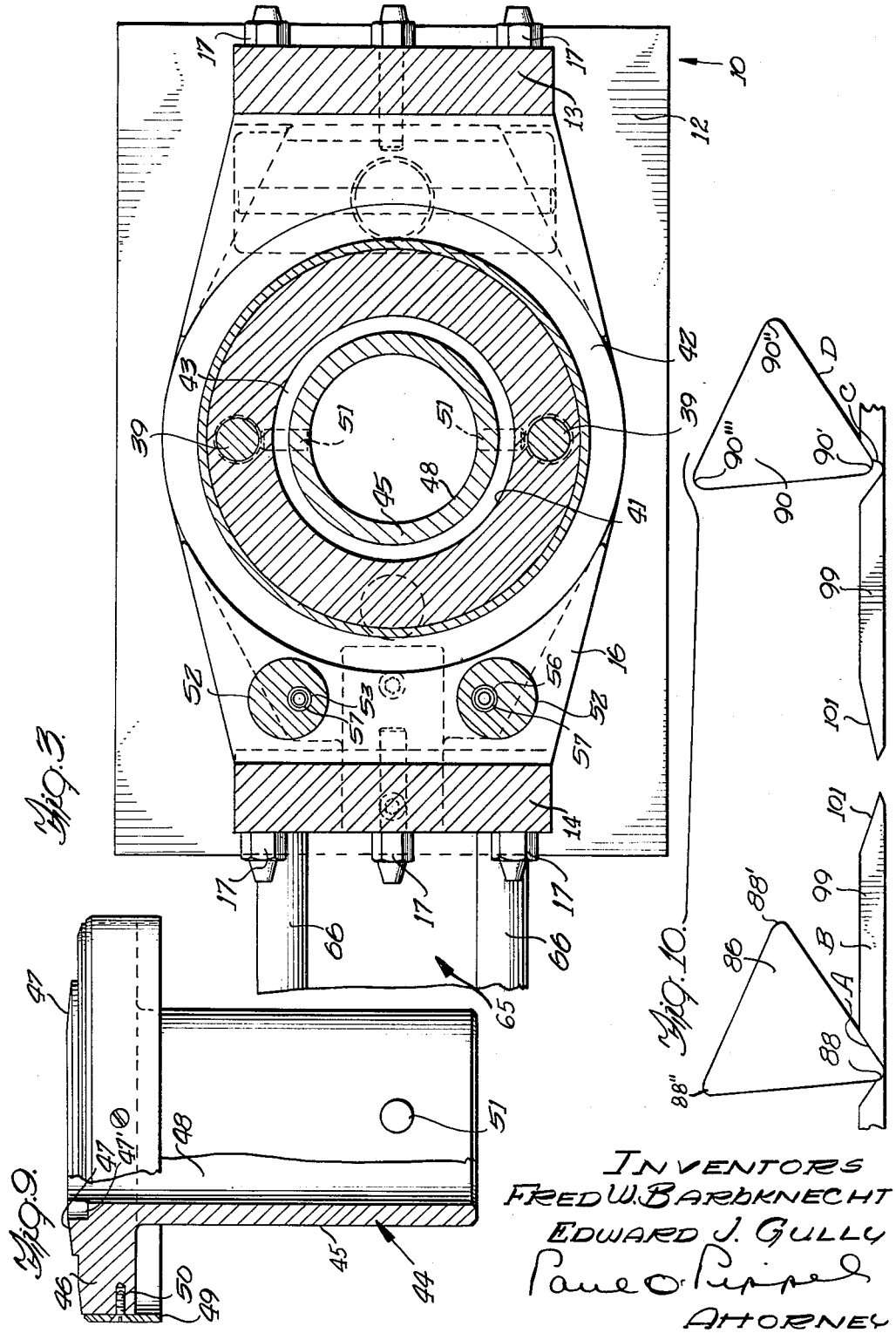

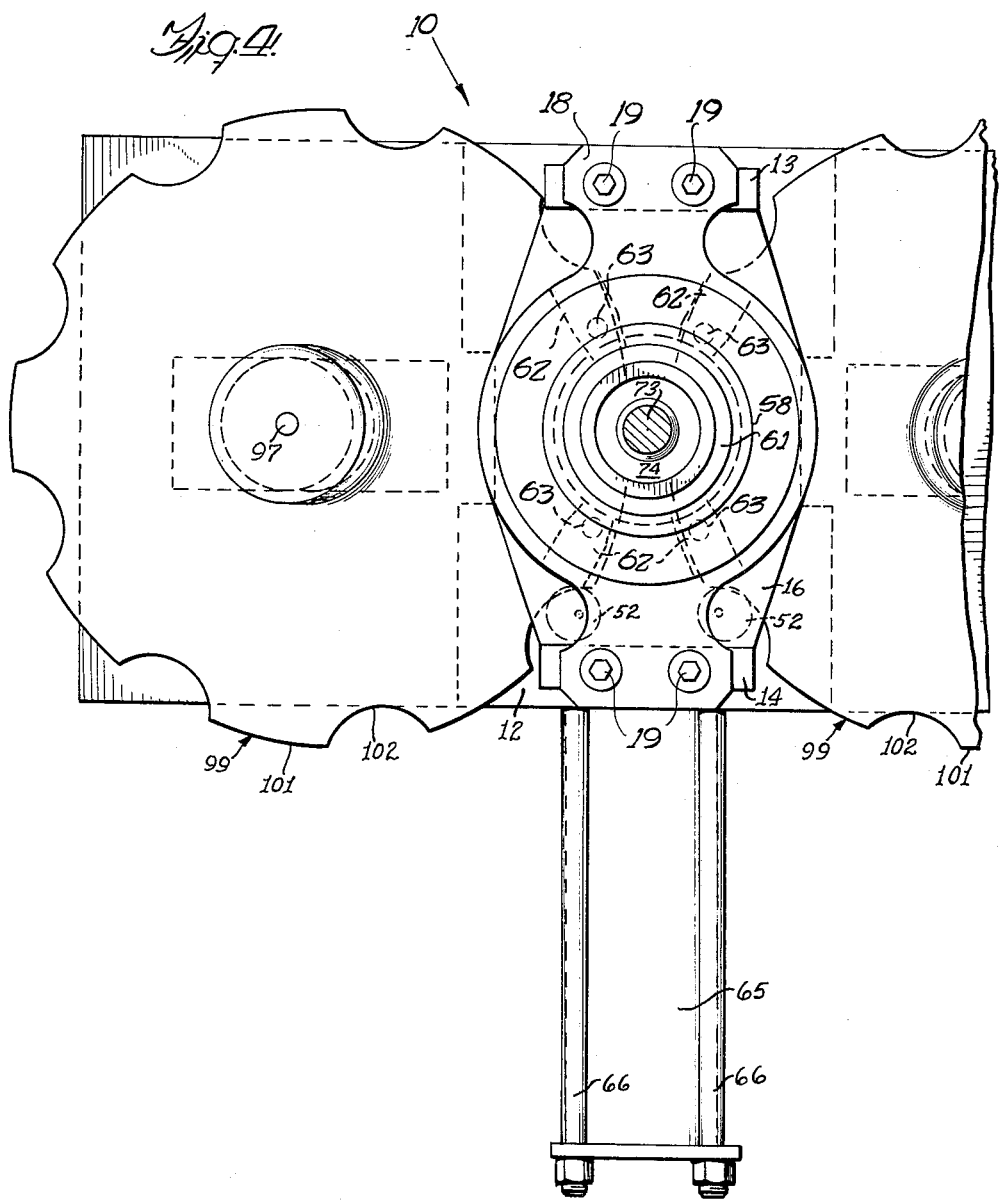

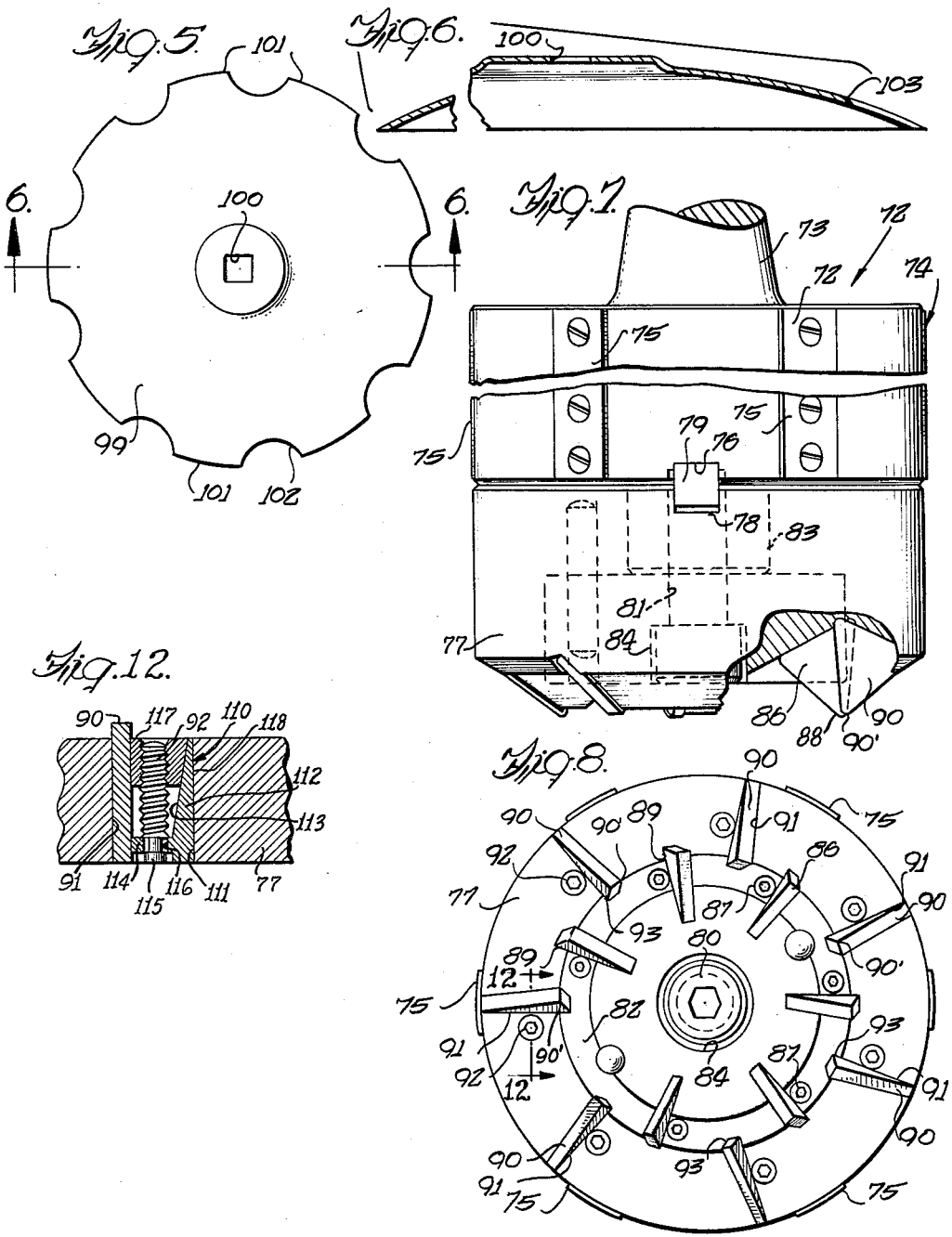

United States Patent Office 3,083,440
Patented Apr. 2, 1963

3,083,440
METHOD AND APPARATUS FOR MAKING NOTCHED AGRICULTURAL DISKS
Fred W. Barbknecht, Palos Heights, and Edward J. Gully, River Grove, Ill., assignors to International Harvester Company, Chicago, Ill., a corporation of New Jersey
Filed Nov. 20, 1959, Ser. No. 854,517
1 Claim. (Cl. 29—14)

This invention relates to an improved apparatus and method for manufacturing agricultural implement disks. More specifically the invention relates to a method and an apparatus for producing notches in agricultural disks.

This invention is concerned with a steel type of disk used in connection with farm implements engaged in earth tilling operations. Such disks may be utilized on a harrow or they may be used as plows in connection with plowing operations. Disks of this type in many instances are provided with peripherally disposed notches which in turn have arcuate sharpened edges which facilitate the cutting of stalks, weeds, etc., during the use of the implement. In manufacture the disks are generally formed by rolling and subsequently the peripheral edge is sharpened. Subsequent operations for forming the notches may include grinding or punching. In many instances operations of this type leave surface imperfections in the punched or ground sections which in future use seriously hamper the long life of the disk and frequently necessitates replacement due to sections of the disk breaking off. It is a prime object of this invention to provide an improved method and an apparatus for manufacturing notches in the peripheral edges of agricultural disks.

A still further object is to provide a new improved apparatus adapted to securely clamp laterally spaced peripheral edges of agricultural disks in position and including a cutter adapted to be moved into engagement with the peripheral edges of the disk for cutting peripheral notches, the cutter also being adapted to simultaneously, with the cutting, sharpen arcuate edges in the notched portions of the disk.

A still further object is the provision of an improved cutter for machining the peripheral edges of agricultural disks to achieve notches in the said periphery, the said cutter comprising a first cutting element adapted to machine the disk to cut off an arcuate portion and including a second cutter which simultaneously with the cutting operation is adapted to engage a portion of the disk to provide a beveled wall on the arcuate notched portion remaining.

A still further object is the provision of an improved clamping assembly for quickly clamping adjacent edges of an agricultural disk so that the edges may be notched, the said clamping assembly being operable to quickly effectuate positive clamping of the said edges.

A still further object is the provision of an improved method of notching the peripheral edges of an agricultural disk having a disk surface, the said method including the steps of clamping the peripheral edges of the disk and for utilizing a cutting device for forming an arcuate groove in said disk surface, the said groove being progressively deepened until an arcuate slug is cut from the disk thereby leaving an arcuate wall, and simultaneously with the progressive deepening of the groove beveling the arcuate wall to provide a sharpened arcuate cutting edge.

These and other objects will become more readily apparent from a reading of the description when examined in connection with the accompanying sheets of drawings.

FIGURE 1 is a front elevational view, with certain portions broken away, of an apparatus or fixture for notching peripheral edges of concave agricultural disks;

FIGURE 2 is a side elevational view, with certain portions broken away, of the apparatus or fixture for notching agricultural disks shown in FIGURE 1;

FIGURE 3 is a cross sectional view taken substantially along the line 3—3 of FIGURE 2;

FIGURE 4 is a plan view of a major portion of the apparatus shown in FIGURES 1 and 2;

FIGURE 5 is a side elevational view of an agricultural disk formed with the use of the present invention;

FIGURE 6 is an enlarged cross sectional view taken along the line 6—6 of FIGURE 5;

FIGURE 7 is an enlarged side elevational view, with certain portions broken away, of a cutter or machining member used with the apparatus shown in FIGURES 1, 2, 3 and 4;

FIGURE 8 is a view of the underneath side of the cutter shown in FIGURE 7;

FIGURE 9 is an enlarged side elevational view, with certain portions broken away, of a clamping member utilized in connection with the apparatus mentioned above;

FIGURE 10 is an enlarged diagrammatic view showing the position of certain cutting elements in the process of forming notches in the peripheral edges of adjacent agricultural disks;

FIGURE 11 is a plan view of a yoke detail used with the aforementioned apparatus; and FIGURE 12 is a detail sectional view of a cutting blade locking means taken along line 12—12 of FIGURE 8.

Referring now particularly to FIGURES 1 through 4, an apparatus for producing notched agricultural disks is generally indicated by the reference character 10. The apparatus 10 comprises a base or support 11 having positioned thereon a base plate 12. A pair of horizontally spaced upright supports 13 and 14 are suitably supported on the base plate 12 and each of the supports 13 and 14 is provided with a horizontally extending recess 15. An intermediate horizontal plate 16 is supported within the recesses 15 and is securely held onto supports 13 and 14 by means of screws 17. A top cross plate 18 extends horizontally and is supported on top of the supports 13 and 14, being rigidly connected thereto by means of screws 19. The base 12 is provided with an annular boss 20 and also includes an opening 21 in which a sleeve 22 is positioned. The boss 20 is also provided with an opening 23 in registry with and of the same inner diameter as the sleeve 22. The base 12 is also provided with a bore 24 having a pin 25 positioned therein. A set screw 26 is threaded into the base 12 and engages the pin 25 to secure the same on the base 12. The pin 25 comprises a threaded portion 27 on which a jack nut 28 is threaded. A recess 29 is formed in a yoke 30, the said recess receiving the upper end of the pin 25 and in turn being pivotally connected to said pin 25 by means of a pivot pin 31. The yoke 30 is best shown in FIGURE 11. The yoke 30 is also provided with an opening 32 in axial alignment with the opening 23. The forward end of the yoke 30 is provided with a cam surface 33 and includes a wear plate 34, as best shown in FIGURE 2, which is held in position on the yoke by means of screws 35. The yoke 30 also includes a bore 36 having a spring 37 disposed therein.

As shown in FIGURE 11, the yoke 30 is also provided with laterally spaced vertical open end bores 38 which serve to seat vertical thrust pins 39. The intermediate plate 16 is provided with a bore 40 which forms a seat for the spring 37, the spring normally urging the yoke 30 in a downward direction.

The intermediate plate 16 is also provided with a vertical opening 41 and an annular recess 42. The opening 41 is in registry with the opening 23. A guide bushing 43 is disposed in the vertical opening 41. A clamping sleeve is generally designated at 44, this sleeve being best shown in FIGURE 9. The clamping sleeve 44 comprises a tubular stem 45 having an enlarged head portion 46. The head 46 comprises an annular clamping surface 47 and the sleeve 44 as indicated at 48 is of hollow construction. An insert ring 47', as shown in FIGURE 9, also forms a portion of the clamping surface 47. The head portion 46 is provided with a skirt 49 suitably connected to the head 46 by means of screws 50. The sleeve 44 is also provided at its lower end with a pair of laterally extending pins 51.

Referring now particularly to FIGURES 2, 3 and 4, a pair of bosses 52 are provided on the plate 16. The bosses 52 include vertical bores 53 in which pins 54 are slidingly positioned. The pins 54 include heads 55 which retain the pins 54 within bores 56 provided within the bosses 52. Springs 57 engage the heads 55 for urging the pins 54 in an outward direction.

The top plate 18 is provided with a tubular extension 58 having an opening 59 extending through the cross plate 18. A bushing 61 is provided in the opening 59. The underneath surface of the plate 18 supports a number of clamping pads 62 circumferentially spaced around the lower end of the bushing 61. The clamping pads are suitably connected to the plate 18 by means of screws 63, and include clamping surfaces 64.

Referring particularly to FIGURES 1, 2, 3 and 4, an air cylinder 65 is suitably supported by means of rods 66 on the vertical support 14. The cylinder 65 may be of conventional construction including a piston 67 adapted to reciprocate a rod 68 which in turn is suitably connected to a cam 69 slidingly positioned on a wear plate 70 supported on the base 12. The cam 69 includes a cam surface 71 adapted to be moved into engagement with the cam surface 33.

Referring now to FIGURES 1, 7 and 8, a machining cutter is generally designated by the reference character 72. The machining cutter 72 comprises a shank 73 adapted to be placed in the chuck of a suitable drill press or other turning member not shown. The cutter 72 comprises an upper cylindrical body 74 having connected thereto in circumferentially spaced relation a plurality of wear strips 75. The lower end of the body 74 is provided with a transversely extending recess 76. A lower body member 77 is positioned below the body 74 and also includes a recess 78 registering with the recess 76 and providing for key means 79 which secure the bodies 74 and 77 against relative rotation. A screw 80 disposed in a bore 81 provided in a cylindrical member 82 suitably engages an extension 83 provided on the upper body member 74 for rigidly securing the lower body member 77 thereto. A recess 84 in the member 82 receives the head of the screw 80.

The cylindrical member 82 is provided with a plurality of circumferentially spaced slots 85 which have contained therein trepanning cutters 86. The cutters 86 are of triangular shape and may be suitably secured within the slots 85 by means of cap screws 87. Each of the cutters 86 comprises three cutting points 88, 88', and 88". As best shown in FIGURE 8, the body 77 is also provided with partial slots 89 which receive a portion of each of the trepanning cutters 86. A plurality of bevel cutters 90 are disposed outwardly with respect to the cutters 86 and are circumferentially disposed in recesses 91 provided in the lower body 77. The cutters 90 each include three cutting points 90', 90", and 90"'. Cap screws 92 suitably secure the cutters 90 in position and the cylindrical member 82 is provided with a plurality of partial slots or recesses 93 which receive portions of the bevel cutters 90 as best shown in FIGURES 7 and 8. The cap screws 92 each are part of a wedge fastener 110, each being disposed in a bore 111 adjacent each opening 91. The wedge fastener 110 includes a semi-circular body 112 having an inner tapering face 113. The lower end of the body 112 is provided with a shoulder 114 which retains a head and stem 115 rotatably positioned in a bore. The upper end of the screw 92 is threaded to a wedge 117 having a cam face 118 slidably supported on the tapering face 113. Rotating of the screw 92 causes the wedge to be tightened against the cutter 90 to retain the same in the recess 91. Each cap screw 87 is similarly associated with a wedge fastener 110.

Referring now to FIGURES 1 and 4, disk supports are designated by the reference character 94, the said supports 94 being disposed on opposite sides of the base plate 12. The supports each include a base member 95 supported on the base 11 by means of bolts and nuts 96. The base members 95 support vertically extending pins 97 which have supported thereon spacer members 98. A disk 99, as best shown in FIGURES 5 and 6, includes a center hole 100 and an outer beveled cutting edge 101. The disk shown is of the concave harrow type of disk and includes a plurality of scallops or notches 102 formed with the above described apparatus. The notches 102 are of arcuate shape and, as best shown in FIGURE 6, each includes a sharpened arcuate wall 103.

In the operation, disks 99 are positioned on the pins 97 so that they may be easily rotated. In this position as shown in FIGURE 1, upper peripheral edge portions of the disks engage the clamping surfaces 64. The apparatus is usually positioned in a rotating machine tool such as a drill press and the shank 73 is suitably connected to the chuck (not shown) of a drill press for rotation. The operator now actuates the cylinder 65 by suitable fluid pressure means to move the cam 69 in a direction to the right in FIGURE 2, whereupon the cam surface 71 engages the cam 33 of the member 30 and whereby the member or yoke 30 is pivoted on the pin 31 and is moved upwardly against the spring 37. The upward movement of the yoke 30 causes the pins 39 to engage the underneath surfaces of the head 46 of the clamping member 44 whereupon the clamping member is moved in an upward direction against the underneath surfaces of the disks whereupon the clamping surfaces 47 and insert ring 47' securely clamp peripheral edge portions of the disks against the angled clamping surfaces 64. Thus the concave type of disks shown are securely clamped in position for the machining operation. It is of course understood that a similar clamping action can take place in the notching of colter disks which are not concave but which are flat disks.

The cutter 72 is rotating and is now lowered through the bushing 61 downwardly into engagement with peripheral edge portions of the clamp disks. Referring now particularly to the diagrammatic view shown in FIGURE 10, the trepanning cutter 86 has its cutting point 88 positioned below the cutting point 90' of the beveling cutter 90. Thus the cutters 86, which are the cutters positioned nearest the axis of the cutter 72, engage the upper surface of the disks initially in machining relation whereby, due to the shape of the cutter, a V-shaped type of groove generally designated at A in FIGURE 10 is formed, the groove A being progressively deepened as the cutter rotates until the disk edge portion is machined through and an arcuate slug B is then removed from the portion of the disk. The groove A which is progressively formed by the action of the cutters 86 leaves the disks with a substantially vertical wall or a wall parallel to the axis of rotation of the cutter, the said wall being shown in FIGURE 10 and designated at C. While the cutters 86 are thus rotating and machining in a trepanning fashion, simultaneously the cutter 90, by virtue of the angularly positioned cutting edge D, bevels progressively the portion of the disk so that the substantially vertical wall C is completely removed and a beveled or sharpened edge 103 is formed as disclosed in FIGURE 6.

In other words, in the performance of the process the trepanning cutter initially cuts an arcuate groove which very quickly is deepened until separation of the metal. The arcuate groove, however, is characterized in that the inner wall is substantially vertical or parallel with respect to the axis of the cutter, the other wall being at an acute angle to provide the V-shaped groove. Then simultaneously while the trepanning action is being performed and during rotation of the same cutter, a second cutter performs the beveling function on the substantially upright or vertical wall. Thus, in effect, the operation is very rapid and both cutting or trepanning and beveling of the arcuate portion takes place. The cutters are of triangular shape so that all three sides may be utilized for cutting and beveling. In the previous Barbknecht Patent 2,533,756, patented December 12, 1950, a machine is disclosed for beveling the peripheral notches of disks. However, in this case it is clearly shown that both the trepanning and the beveling takes place in a simultaneous operation and thus the speed of manufacture is greatly enhanced.

As the notches 102 are formed the disks are rotated and the pins 54 serve to provide indexing means for the disks since the pin will move upwardly in each notch and the operator thus will be guided in the rotation or indexing of the disk. After all of the notches have been formed in the disk, it is a simple matter to release the cam 69 whereupon the clamping sleeve 44 is lowered and the disks are free to be removed.

Thus it can be seen that an improved apparatus and process for manufacturing notched disks has been described. Accuracy, speed of manufacture, and an improved disk are obtained. Thus the objects of the invention have been fully achieved and it must be realized that changes and modifications may be made which do not depart from the spirit of the invention as disclosed or the scope thereof as defined in the appended claims.

What is claimed is:

An apparatus for forming an arcuate notch in the peripheral edge of a metal disk comprising, a base, vertically extending horizontally spaced supports carried by said base, a horizontal top plate supported on said supports, said plate having a first vertical opening therethrough, a clamping pad connected to the underneath side of said top plate, a second horizontal plate carried by said supports between said top plate and said base, said second plate having a second opening in vertical alignment with said first opening, a clamping member having a vertical portion mounted for reciprocation in said second opening, said clamping member including a clamping head positioned above said second plate, means for moving said clamping member vertically including a horizontally extending yoke having one end pivotally supported on said base, said yoke having a cam at an opposite end, horizontally movable cam means adapted to engage said cam for pivoting the same and raising a portion of said yoke vertically, means interconnecting said yoke with said clamping member whereby during said movement of said yoke said clamping member is moved and engages a portion of the peripheral edge of said disk to clamp the same against said pads, a rotatable cutter projecting downwardly through said first opening, said cutter having a cylindrical body, a first cutting element on said cylindrical body spaced radially from the axis thereof, said first cutting element including a first cutting point, a first cutting edge sloping from said first cutting point upwardly and inwardly with respect to the axis of said cutter, and adapted during rotation of said cutter to cut and remove a portion of said disk adjacent its edge to form an arcuate notch defined by a substantially vertical wall, a second cutting element on said cylindrical body spaced radially from the axis of said cutter and disposed in circumferential spaced relation with respect to said first cutting element, said second cutting element including a second cutting point disposed vertically above said first cutting point, said second cutting element including a second cutting edge sloping upwardly and outwardly with respect to the axis of said cutting element whereby during rotation of said cutter said wall is beveled by said second cutting edge.

References Cited in the file of this patent

UNITED STATES PATENTS

| | | |
|---|---|---|
| 308,842 | Hunt | Dec. 2, 1884 |
| 1,472,960 | Conklin | Nov. 6, 1923 |
| 2,236,944 | Gerardi | Apr. 1, 1941 |
| 2,468,562 | Lank | Apr. 26, 1949 |
| 2,533,756 | Barbknecht | Dec. 12, 1950 |
| 2,547,789 | Skeel | Apr. 3, 1951 |
| 2,705,448 | Ingersoll | Apr. 5, 1955 |
| 2,805,467 | Greenleaf | Sept. 10, 1957 |

FOREIGN PATENTS

| | | |
|---|---|---|
| 1,174,641 | France | Nov. 3, 1958 |